United States Patent [19]

Bertoia

[11] 4,316,698
[45] Feb. 23, 1982

[54] FLUID-DRIVEN TURBINE WITH SPEED REGULATION

[76] Inventor: Val O. Bertoia, R.D. #1, Barto, Pa. 19504

[21] Appl. No.: 69,164

[22] Filed: Aug. 23, 1979

[51] Int. Cl.³ .............................................. F03D 7/04
[52] U.S. Cl. ....................................... 416/11; 416/41; 416/132 B
[58] Field of Search ........... 416/132 B, 139 A, 135 A, 416/9, 41, 11, 136, 137, 43, 131

[56] References Cited

U.S. PATENT DOCUMENTS

| | | | |
|---|---|---|---|
| 1,123,465 | 1/1915 | Artibee | 416/136 |
| 1,250,263 | 12/1917 | Yates | 416/136 R |
| 1,633,842 | 6/1927 | Bishop | 416/11 X |
| 2,516,576 | 7/1950 | Jacobs | 416/135 A |
| 2,655,604 | 10/1953 | Hütter | 416/50 A X |
| 2,832,895 | 4/1958 | Hütter | 416/41 X |
| 4,029,434 | 6/1977 | Kenney | 416/139 A X |
| 4,084,921 | 4/1978 | Norz | 416/11 X |
| 4,183,715 | 1/1980 | Ducker | 416/41 |
| 4,201,514 | 5/1980 | Huetter | 416/132 B |

FOREIGN PATENT DOCUMENTS

| | | | |
|---|---|---|---|
| 500792 | 2/1951 | Belgium | 416/11 |
| 951709 | 10/1956 | Fed. Rep. of Germany | 416/41 |
| 1036780 | 8/1958 | Fed. Rep. of Germany | 416/139 A |
| 2715584 | 10/1978 | Fed. Rep. of Germany | 416/132 B |
| 2825061 | 12/1979 | Fed. Rep. of Germany | 416/132 B |
| 614823 | 12/1926 | France | 416/132 B |
| 868278 | 12/1941 | France | 416/132 B |
| 908631 | 4/1946 | France | 416/132 B |
| 922918 | 6/1947 | France | 416/11 |
| 1036341 | 9/1953 | France | 416/11 |
| 1058863 | 3/1954 | France | 416/138 R |
| 2413566 | 8/1979 | France | 416/132 B |
| 57405 | 5/1946 | Netherlands | 416/138 |
| 124935 | 4/1919 | United Kingdom | 416/137 |
| 434604 | 9/1935 | United Kingdom | 416/137 |
| 730060 | 5/1955 | United Kingdom | 416/41 |

Primary Examiner—Everette A. Powell, Jr.
Attorney, Agent, or Firm—Charles H. Lindrooth

[57] ABSTRACT

A wind-driven turbine with a self-regulating pitch control system is disclosed. The turbine includes a wheel having a plurality of wings or blades that rotate about a longitudinal pivot axis through a pitch range. The blades are in coned or parallel relation to the axis of rotation of the wheel. Biasing means are provided for biasing the wings toward a starting pitch position. The center of gravity of each wing is spaced from the axis of rotation of the wheel and from the pivot axis of the wing toward its trailing edge. Centrifugal force acting on the wings causes them to move from a starting pitch orientation to a power pitch orientation as the speed of the turbine increases. A system is provided for selectively controlling the pitch of the wings, preferably from a location remote from the turbine.

14 Claims, 5 Drawing Figures

FLUID-DRIVEN TURBINE WITH SPEED REGULATION

FIELD OF THE INVENTION

This invention relates to fluid-driven turbines that can be utilized to drive various mechanisms, such as electrical power generators. Specifically, the invention relates to a high tip speed wind turbine with an integral speed regulation and protection system and a system for selectively controlling the speed of the turbine.

BACKGROUND OF THE INVENTION

From an historical perspective, wind-driven turbines have been used for centuries to provide motive power for mechanical equipment such as grinding mills and pumps. Also, for many years, there have been developments and proposals for utilizing wind turbines to provide the motive force for electrical generators. This latter subject has, in the past few years, received an increasing amount of attention as a result of supply and environmental problems involved with conventional fossil and nuclear fueled generating stations. However, a problem that has retarded the acceptance of wind turbines for use by individual users is that such systems tend to be relatively expensive and thus typical payback periods for amortizing the cost of such installations on the basis of power savings from commercial suppliers has been on the order of twenty years. One of the primary reasons that the cost of such units is high is that the turbine must be capable of operating over a wide range of ambient wind conditions, from light breezes in the range of eight to sixteen kilometers per hour to sudden gusts and gale force winds that may be in the range of eighty to one hundred sixty kilometers per hour. Also, electrical power can be generated most efficiently by generators that are designed to operate at maximum efficiency within a relatively narrow speed range. Therefore, it is necessary to have a turbine that will be operative in relatively light winds, withstand relatively high winds, and yet operate within a relatively narrow speed range. In addition, it has been found that fast-turning turbines are more aerodynamically efficient than slow-turning turbines because the ratio of lift forces to drag forces on the turbine blades increases as rotor speed increases—that is, high speed turbines extract more power for a given turbine size as compared with low speed turbines. Thus, it is desirable to use high tip speed turbines that have lift-to-drag ratios exceeding 50:1. However, such turbines tend to overspeed when driven by winds exceeding the normal design range, for example, winds over forty kilometers per hour. Uncontrolled overspeeding can result in destruction of the turbine as well as destruction of the power-generating equipment. These factors have tended to complicate the designs of prior wind turbines with attendant increase in cost.

Because more power can be extracted from the smaller high-speed turbines, the amount of material used to construct such turbines can be lessened, thereby lowering costs. Further, because the generating system is being driven at higher speeds, smaller, lower-cost generators or alternators can be used to produce a given power output. Because the size and weight of the turbine and the size and weight of the rotating parts of the electrical power-producing equipment are relatively lower, the wind power, which is primarily a function of wind speed, necessary to initiate rotation of the system is lessened. Thus, the system will begin turning and producing power at lower wind speeds and will operate more frequently, thus increasing the amount of energy derived from the unit over a given time span.

Heretofore, efforts of several different types have been made to control wing tip speed in wind-driven turbines. Mechanical friction brakes applied either directly to the turbine axle or indirectly have been proposed for decelerating or limiting the speed of the turbine wheel, but the power converted to heat in such friction brakes is merely lost to the ambient.

Some designs employ air flow spoilers mounted on or near the wing tips that cause turbulent flow conditions and increase drag to retard forward spin. Apparatus of this type includes wings having "air brakes" that become operative after the turbine reaches a predetermined speed. The spoilers attempt to dissipate or redirect the oncoming wind, yet the wind forces still attempt to drive the turbine so that this method of speed control tends to induce wing stresses within the turbine.

Control systems are used that govern the electrical or mechanical load on the turbine to reduce rotational speed. The systems must be built into the power generator or its drive train and tend to raise the cost of the generating assembly.

Systems employing means for reorienting the turbine away from the prevailing wind direction have also been proposed. However, such systems lack responsiveness, especially with large diameter turbines, because gyroscopic and inertial forces prevent the turbine from being moved quickly enough to offer effective protection.

In other attempts, the wing angulation or pitch is varied in response to centrifugal forces imposed on movable weights that are at or near the turbine hub or on axially movable blades, so that the turbine blades can release or spill excessive wind force build-up on the front face of the wheel, thereby losing potential driving force and absorbing less power.

Designs employing these expedients are shown in U.S. Pat. No. 2,832,895 and U.S. Pat. No. 2,505,969, respectively. Such designs employ relatively complicated and expensive mechanical linkages for controlling wing pitch.

SUMMARY OF THE INVENTION

This invention concerns wind turbine designs that employ a self-regulation feature whereby the pitch of the turbine wings is governed by the rotational speed of the turbine. Under low speed conditions, as when winds are light, the blades are positioned in a starting pitch position with respect to the plane of rotation of the turbine. As the rotational speed of the turbine increases, the pitch of the blades is changed.

The wings are designed so that centrifugal force acts directly upon the wings to change their pitch in accordance with wheel speed, without the need for additional speed-sensing controls. Each wing is mounted so that its center of gravity is spaced from the pitch axis of the wing, toward the trailing edge of the wing. Centrifugal force on the wings, which is balanced against forces derived from a biasing means, tends to drive the wings toward power or neutral pitch orientations. The turbine also includes a control system for overriding the automatic regulating means so that the turbine can be brought to a desired speed or stopped at the control of the user. If desired, the pitch of the blades can be brought to a negative position so that an aerodynamic braking force is applied to the turbine.

DESCRIPTION OF THE PREFERRED EMBODIMENT

Figure 1:
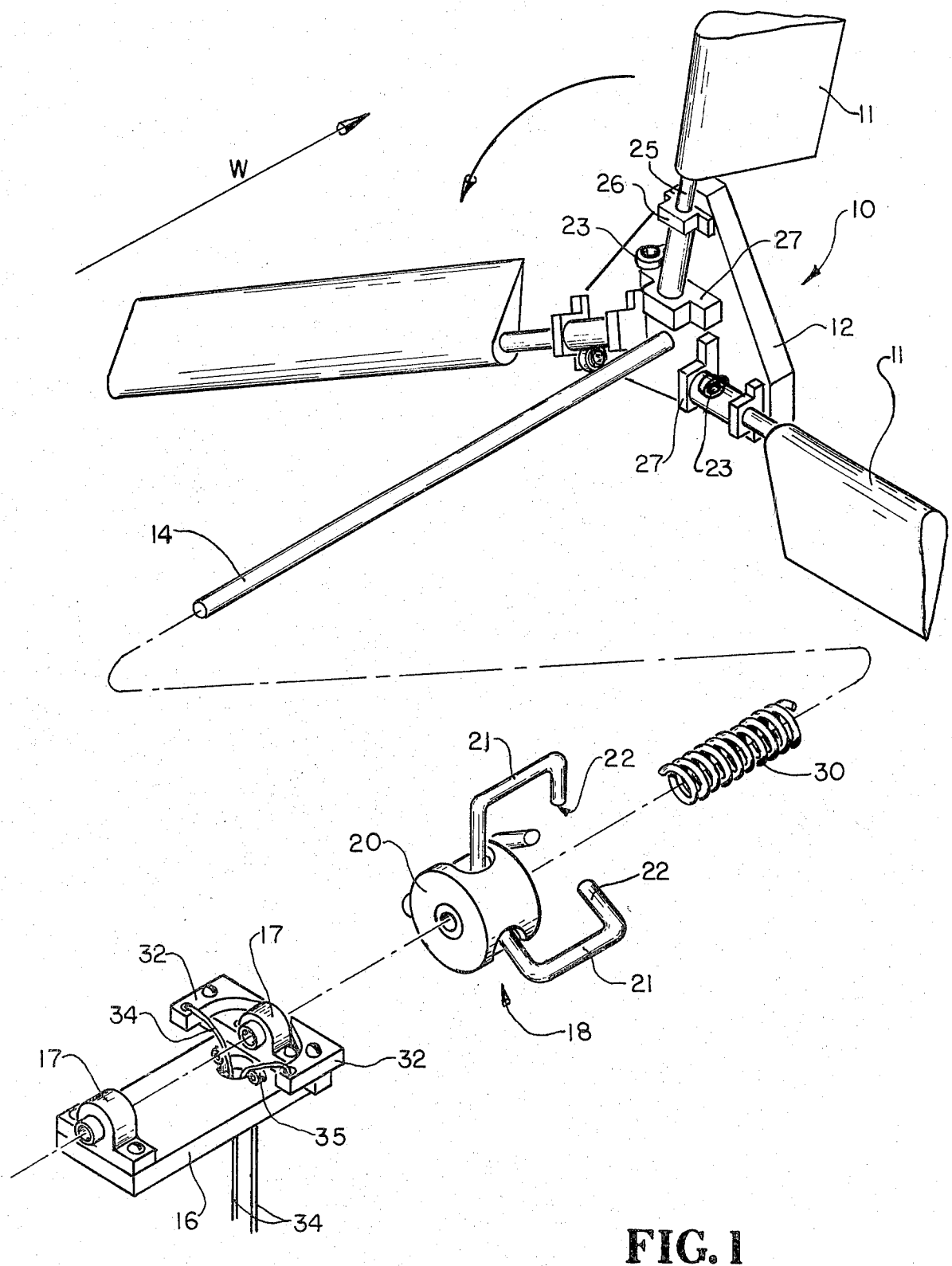
FIG. 1 is an exploded isometric view of a preferred wind wheel having features in accordance with the invention.

FIG. 1 shows, in an exploded view, the major components of a wind turbine in accordance with the present invention. The turbine includes a winged wheel or rotor 10 that has a plurality of wings or blades 11. In the embodiment shown, the wheel has three blades, although wheels having a greater or lesser number of blades are within the contemplation of the invention. The blades are mounted on a central hub or carrier element 12 and are equi-angularly spaced from each other in a manner that allows pivoting of the blades along a longitudinal pitch or pivot axis $A_P$ (FIGS. 2 and 4); the means for pivotally mounting the wings will be described hereafter in greater detail.

Figure 3:
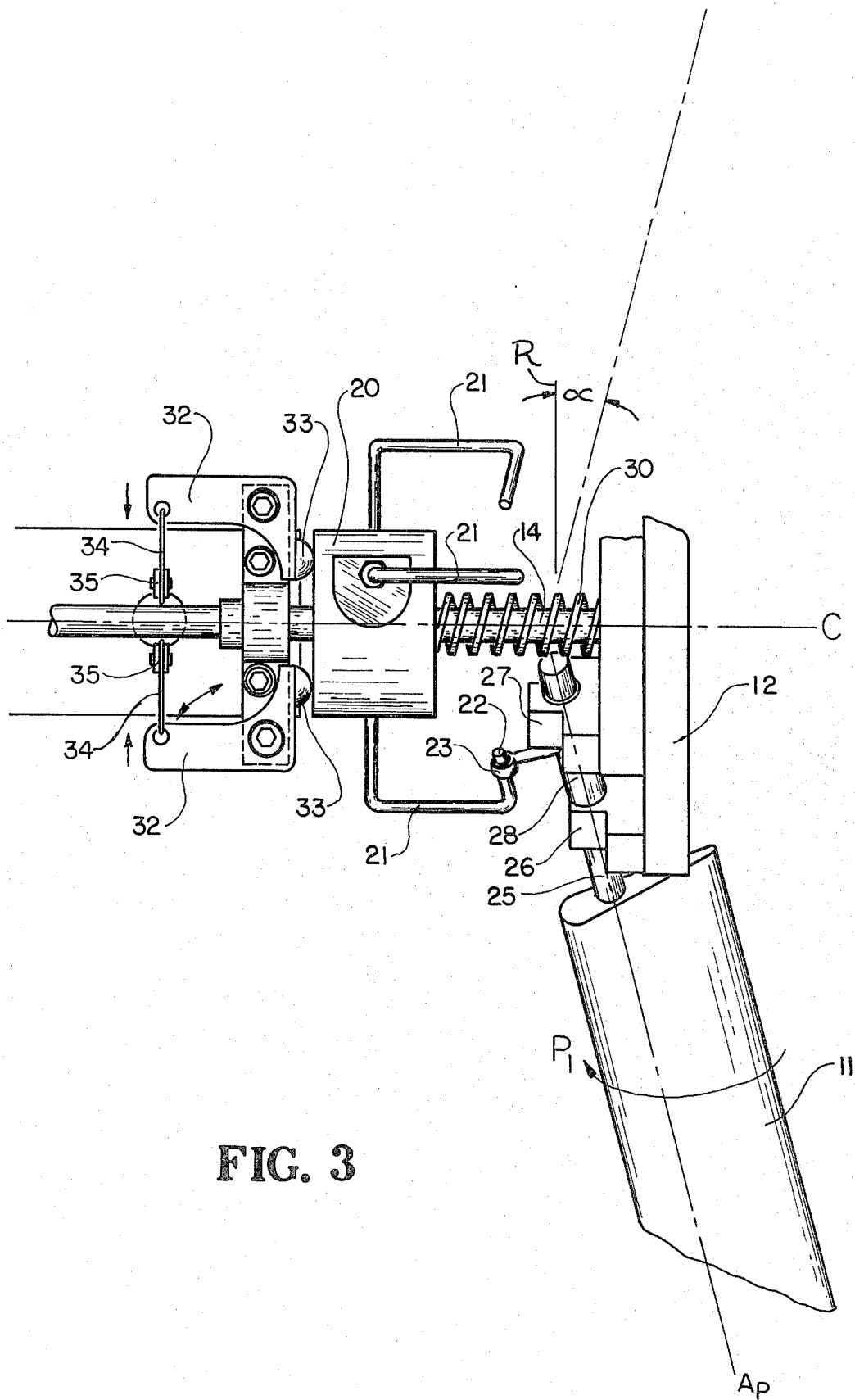
FIG. 3 is a partial fragmentary view of a preferred system for selectively controlling the pitch of the wings.
Figure 4:
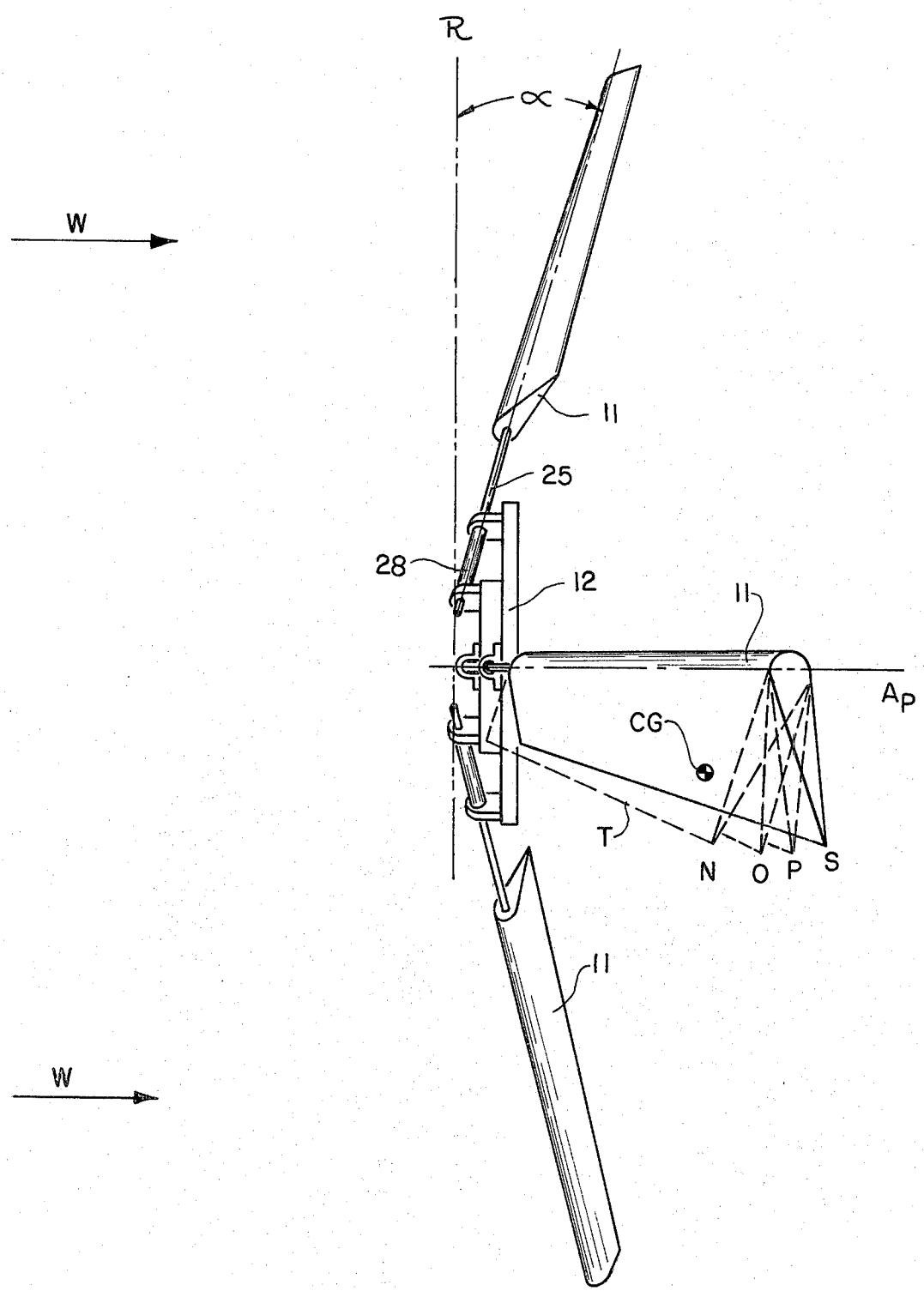
FIG. 4 is a side view of a wind wheel in accordance with the invention showing positions attainable by one of the wings.

The carrier element 12 is fixedly mounted on a shaft 14, the longitudinal axis of the shaft defining the axis of rotation of the wheel 10. In the embodiment illustrated, the blades 11 are mounted on the carrier element 12 in angular relationship with respect to the axis of rotation of the wheel; that is, the blades of the wheel are coned so that the longitudinal axes $A_P$ of each of the blades form the generatrix of a cone. Referring to FIGS. 3 and 4, the cone angle $\alpha$ is the angle between the blade and the plane of rotation R of the carrier element about the axis of rotation C of shaft 14. The cone angle can be from about 5° to about 45° for horizontal axis turbines; however, the preferred range is a cone angle of 10°–15°.

It should be realized also that wheels having blades substantially parallel to the axis of wheel rotation, for example, as in a vertical axis turbine, are equally within the contemplation of the invention.

Wind turbines are usually placed atop a tower so as to avoid blockage of the wind and dissipation of its force by ground obstructions. Such a tower is not shown; however, it should be understood that the turbine unit is mounted on the tower by means of a base plate 16 that is free to rotate about a vertical axis to align the turbine unit in an optimum relationship with respect to the prevailing winds, i.e., with the wheel positioned on the downwind side of the tower. The base plate 16 includes suitable bearings 17 that rotatably receive the shaft 14. The axis of rotation of the shaft 14 can be disposed horizontally or at a slight angle to the horizontal. The drive shaft 14 can be coupled directly to an electrical power generating means (not shown) or other device capable of using the power from shaft 14 or, alternatively, the shaft can drive the generator through a suitable transmission system (not shown).

The turbine also includes an interconnecting means 18 for linking the blades 11 together. The interconnecting means 18 in the preferred embodiment includes a thrust plate 20 that, conveniently, can be mounted for slidable movement on the shaft 14. Extending from the periphery of the thrust plate 20 are a plurality of arms 21 (see also FIG. 3) equal in number to the wings on the carrier element and spaced equidistantly about the thrust plate. The arms include means for engaging wing pivoting elements associated with each wing. In the embodiment shown, such means comprises the inwardly turned ends 22 of the arms 21. These ends 22 are rotatably received in rockable-type pivot couplings 23 that are affixed to the enlarged portions 28 of the stub shafts 25. It can readily be seen that sliding movement of the thrust plate 20 will move the arms 21 and cause movement of couplers 23, thereby causing the wings 11 to be pivoted about their respective pivot or pitch axes $A_P$.

Figure 2:
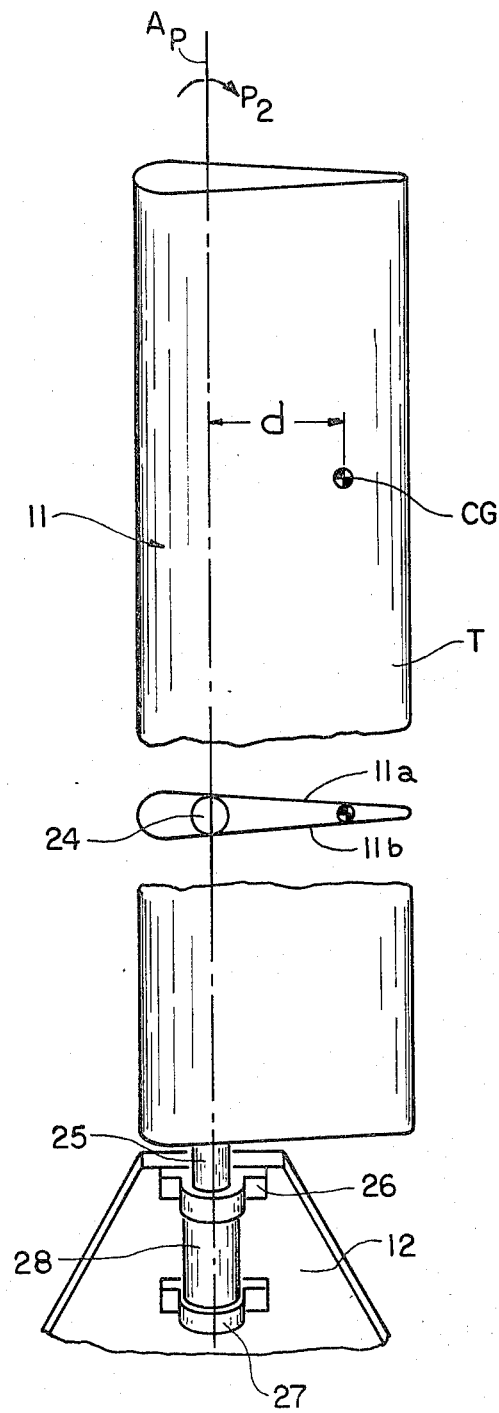
FIG. 2 is a partial fragmentary view of one wing illustrating features of the mounting system.

Referring more particularly to FIGS. 2 and 3, each wing 11 includes, for example, a longitudinally extending spar 24, a lower portion 25 of which extends outwardly from one end of the wing to form stub shaft 25. In the embodiment shown, the wing surfaces 11a, 11b are formed essentially of a lightweight metal skin shaped to form a hollow interior through which the spar 24 passes. The wing surfaces are affixed to the spar by suitable means, such as pins, rivets, welding, etc. The wings 11 are mounted on the carrier element 12 by means of the stub shaft 25 in a manner that allows pivotal movement of the wing with respect to the carrier element 12, essentially about the longitudinal axis of the spar 24. In the embodiment shown, such mounting comprises a pair of bearing elements 26 and 27 that are mounted on the carrier element 12 and that rotatably receive the stub axle 25. Means are included for retaining the stub shaft, in an axial direction, with respect to the bearings 26 and 27. In the arrangement as most clearly shown in FIG. 2, this means includes an enlarged diameter shaft portion or collar 28 that forms shoulders at each end thereof for maintaining axial placement of the stub shaft 25 between the bearings 26 and 27. The rockable bearing coupling element 23 is mounted on the enlarged portion 28.

The wings are biased toward a starting pitch position by a suitable biasing means. In the preferred embodiment and referring to FIGS. 1 and 3, the biasing means can comprise a compression spring 30 that encircles the shaft and that is disposed between the carrier plate 12 and the thrust plate 20. When the spring 30 is compressed, thereby storing spring force, the force is applied against thrust plate 20 and this force, acting through arms 21, tends to pivot the wings in the direction of arrow $p_1$ (FIG. 3). Thus, at rest, the blades are normally positioned in starting pitch relationship to the carrier element 12 so that the maximum power available from the wind is transmitted to the turbine to overcome its starting inertia.

The blades are capable of changing their pitch, against the action of biasing spring 30, as the speed of the wheel increases. This occurs by reason of the fact that the blades are so constructed and arranged with respect to their pivot axis $A_P$ (see FIGS. 2 and 4) that more than one-half the mass of the wing is located in the portion of the wing between the pitch axis $A_P$ and the trailing edge T, i.e., the center of gravity CG of the blades is located a distance d away from the axis $A_P$ in a direction toward the trailing edge T of the wing 11. It should be recalled that the wings are coned or parallel to the shaft and therefore centrifugal force on the blades will act radially outwardly of the axis of rotation C of the shaft 14, thereby causing the wings 11 to pivot about axis $A_P$ in the direction of arrow $p_2$ (FIG. 2). The amount of centrifugal force exerted on the blades is a function of the angular velocity of the wheel, and thus it can be seen that as the velocity increases, in response to increasing wind velocity, the pitch change toward a neutral position causes the wing to become less efficient so that, even though there is more power available in higher velocity wind, the wheel takes a more or less constant amount of power from the wind and thus turns at a relatively constant speed. The action of centrifugal force acting on the wings is communicated simultaneously to all of the blades of the wheel through the interconnecting system 18 so that the forces on the blades are balanced and all of the blades are disposed at substantially the same pitch. Of course, as the wings pivot in the direction of arrow $p_2$, the arms 21 are drawn axially toward the carrier plate 12, thereby urging the thrust plate along the shaft 14 against the biasing force arising from compression of the spring 30. Through this system, the wings achieve an equilibrium position dictated by the balance between the biasing force of the spring 30 and the centrifugal force acting on the wings. Thus, the turbine tends to run, under normal operation, within a relatively narrow speed range, governed in part by the spring constant of spring 30.

Referring to FIG. 4, the wings are preferably mounted to pivot through an arc of approximately 25°-30°, from a starting pitch position S, through an intermediate power position P, to a neutral position O (at which the blades are positioned substantially normally to the prevailing wind direction), to a position of negative pitch N. In the latter position, a retarding force is applied to the wheel by the wind in order to bring the wheel to a stop.

The turbine also includes means for selectively controlling wing pitch so that, if desired, the speed of the wheel can be controlled or the wheel can be brought to a complete stop.

The system of the preferred embodiment is illustrated in FIGS. 1 and 3 and includes means for engaging the thrust plate 20 so that the thrust plate 20 can be urged toward the carrier element 12. The arrangement for effecting this movement includes a pair of crank or lever arms 32 that are pivotally mounted, for example, on the base plate 16. Suitable bearing elements 33, such as rollers or blocks of antifriction material, are mounted on the arms 32 and positioned to bear against the outer surface of the thrust plate 20. Further, a suitable system is provided for selectively actuating the arms 32. Although it should be realized that many suitable mechanical systems may be provided for so moving the arms, a preferred system comprises cables 34, each of which is attached to an end of one of the arms 32. The cables extend over bearing means, such as rollers 35, and then extend downwardly through the base plate and downwardly through a central portion of the support tower. A person standing at the base of the tower can actuate a suitable control mechanism (not shown) for tensioning the cables, thereby pivoting the arms 32 to a position where they bear against the thrust plate 20 and move it axially toward the carrier element 12, against the bias force of spring 30. As the arms 21 are also carried by the thrust plate 20, the axial movement imparted to these arms results in pivotal movement of the blades 11 arising from the interconnection through arm ends 22 and couplings 23 so that the wings are urged toward neutral or negative pitch positions. Of course, it should be realized that other mechanical or electromechanical means could be employed for selectively bringing about movement of the lever arms 32.

Figure 5:
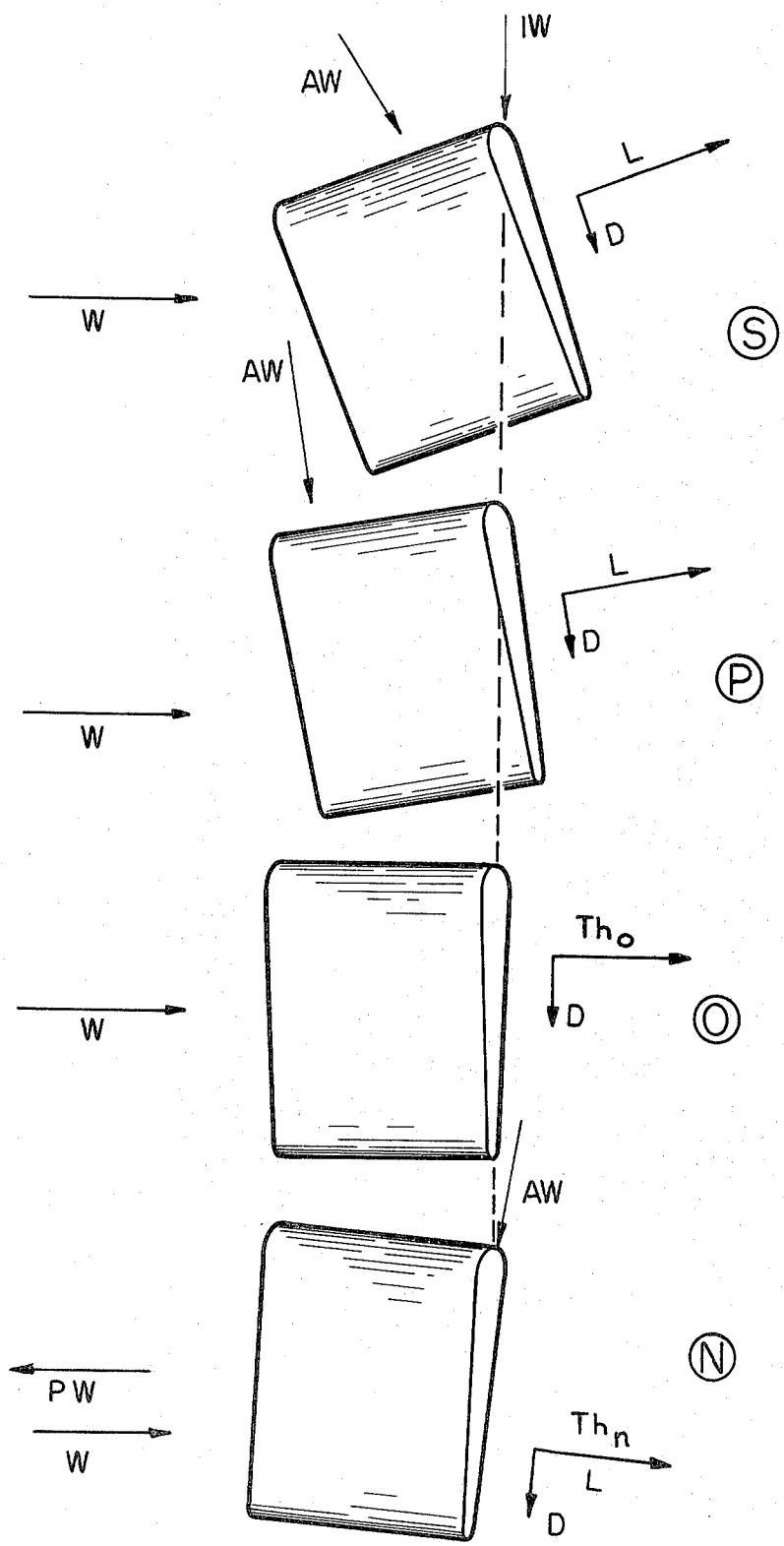
FIG. 5 is a schematic view illustrating the positioning of the wings with respect to the cone of rotation, at various conditions, and the resulting lift and drag forces acting on the wings.

FIG. 5 illustrates the forces acting on a typical wing section under conditions of use. The position S illustrates the position of the blade in the start position. The arrow W indicates the direction of the prevailing wind and the arrow IW indicates the induced wind that the blade "sees" as a result of rotation of the turbine. The vector sum of the true wind and the induced wind is represented by the apparent wind vector AW. As a result of rotation of the turbine, a lift force L and a drag force D are exerted on the wing. In this position, the lift force L can be broken vectorally into a force having a component in the direction of wind W and having a relatively large component of force in the direction of rotation of the wheel. In this position, the wing is most efficient in extracting power from the wind W that is in turn used to overcome the inertia of the wheel and bring it to operating speed.

As the wheel reaches operating speed, the blade has pivoted about its pitch axis to the power position P which is essentially a steady state position in which the inertia of the rotating masses has been overcome and operating speed is reached. At this position, the wings are somewhat less efficient with respect to extracting power from the wind as compared with the starting position. However, to reach this stage of operation, the true wind W will have had to increase beyond starting velocity, meaning that there is more total wind power available to turn the turbine. Thus, through the range of power pitch positions extending between the starting position S and the neutral position O, the power extracted from the wind is relatively constant, as is the speed of rotation of the wheel, even though the wind velocity and load on the power generator may vary.

If a sudden gust of wind is experienced, the pitch of the blade can change further to the neutral position O wherein the blade is presented substantially normally to the direction of the true wind W. In this position, the blade does not generate a useful lift force and thus cannot extract power from the wind to spin the wheel. The only force acting is the drag force D and the neutral thrust $Th_o$ parallel with the true wind W. Thus, the wheel is prevented from overspeeding.

In the event it is desired to bring the wheel to a stop, the selective control means can be utilized to shift the wing to the position N, a negative pitch position, in which case a thrust $Th_n$, having a force component directed counter to the direction of rotation of the turbine, is generated, and if this position is maintained, the wheel is eventually brought to a stop. In this position, an air flow PW is produced by the turbine in a direction opposite that of the wind W.

Wind wheels according to applicant's design that utilize the wing itself as a speed regulation means in the manner described have many advantages. One of the major advantages is that, as the wings pivot toward a neutral pitch position, the moment of inertia of the wheel is increased and this results, in essence, in storing inertial energy in the wheel itself so that the wheel is given a flywheel effect whereby, should the wind velocity diminish, the wheel tends to maintain its speed.

Any decrease in speed results in a corresponding decrease in the moment of inertia in the wheel and this effect tends to keep the wheel turning at a more constant speed. Thus, the wheel itself performs an energy storage function that tends to moderate fluctuations in speed. Moreover, the design results in a wheel that is more readily responsive to a wider range of wind speeds. In addition, the design does not require relatively expensive flyweights and linkage mechanisms in order to achieve pitch control.

In this arrangement, the centrifugal forces acting on the wing are continually finding a state of quasi-equilibrium with the wind forces as the wing travels about its axis of rotation. As a result, the wheel can more efficiently absorb the effects of sudden gusts as well as sustained winds and operate at a relatively steady speed.

I claim:

1. A fluid-driven turbine comprising: a rotatable carrier element; a plurality of wings; means mounting the wings in fixed downwind coned relation with respect to the plane of rotation of the carrier element, said mounting means including pivot means for pivoting each wing about the longitudinal axis thereof; means for biasing the wings to a starting pitch orientation in which the wings are angularly oriented relative to the plane of rotation by an amount which maximizes wind produced rotational forces on the wings, said wings being moveable from the starting pitch orientation towards a neutral pitch orientation, said mounting means further including means for securing the wings to the pivot means at points located forward of the center of gravity thereof, whereby centrifugal forces on the wings arising from rotational motion urge the wings against the action of the biasing means toward the neutral pitch position.

2. Apparatus as in claim 1 wherein a rotatable shaft is provided for rotatably mounting the carrier element and wherein the biasing means includes a thrust plate mounted for axial movement on the shaft toward and away from the carrier element, said biasing means comprising a biasing element adapted to be coactive between the carrier element and the thrust plate and interconnecting means linking the thrust plate to the wings, whereby rotation of the wings about said longitudinal axes imparts axial movement to the thrust plate.

3. Apparatus as in claim 2 wherein the biasing element comprises a spring positioned between the carrier element and the thrust plate.

4. Apparatus as in claim 3 and further including control means operatively associated with the thrust plate for controlling the pitch of the wing remotely from the turbine.

5. Apparatus as in claim 4 wherein the pitch controlling means is operative when the turbine is moving and when the turbine is stationary.

6. A wind turbine comprising: a carrier element; a drive shaft; means for rotatably mounting the drive shaft; means for mounting the carrier element on the drive shaft for rotation with the drive shaft; a plurality of wings; means for mounting the wings on the carrier element in coned relation with respect to the drive shaft, the coning angle of the wings being fixed with the wings inclining in a downwind direction, the wing mounting means including means for permitting rotation of each wing about a pivot axis extending generally longitudinally along each wing between a starting pitch orientation in which the wings are angularly oriented to maximize wind produced rotational forces and a neutral pitch orientation in which wind produced rotational forces are minimized; means for securing the wings on the wing mounting means with the center of gravity of each wing spaced from the pivot axis of each wing toward a trailing edge of the respective wing; means interconnecting the wings for simultaneous pivoting of the wings about their respective pivot axes, the interconnecting means comprising a thrust plate member mountable for movement toward and away from the carrier element and linkage means for linking the wings to the thrust plate member; and biasing means coactive with the interconnecting means for biasing the wings toward said starting pitch orientation.

7. Apparatus as in claim 6 and further comprising means coactive with the thrust plate member for overriding the biasing means to change the pitch of the wings.

8. Apparatus as in claim 6 wherein the biasing means comprises means for developing a spring force.

9. Apparatus as in claim 7 wherein the thrust plate member surrounds the drive shaft and wherein the means for developing a spring force comprises a compression spring disposed between the carrier element and the thrust plate member.

10. Apparatus as in claim 9 and further including means coactive with the thrust plate member to override the biasing means for selectively changing the pitch of the wings.

11. Apparatus as in claim 10 wherein the means for selectively changing the wing pitch comprises at least one movable member having a portion for engaging and moving the thrust plate member in a direction parallel to the axis of rotation of the drive shaft.

12. Apparatus as in claim 11 wherein the thrust plate member is slidably mounted on the drive shaft.

13. Apparatus as in claim 6 wherein each wing is mounted for pivotal movement between a position of positive pitch to a position of negative pitch with respect to the cone of rotation of the wings.

14. Apparatus as in claim 13 wherein the range of pivotal movement of each wing is from about 20° positive pitch to about 5° negative pitch.

* * * * *